UNITED STATES PATENT OFFICE.

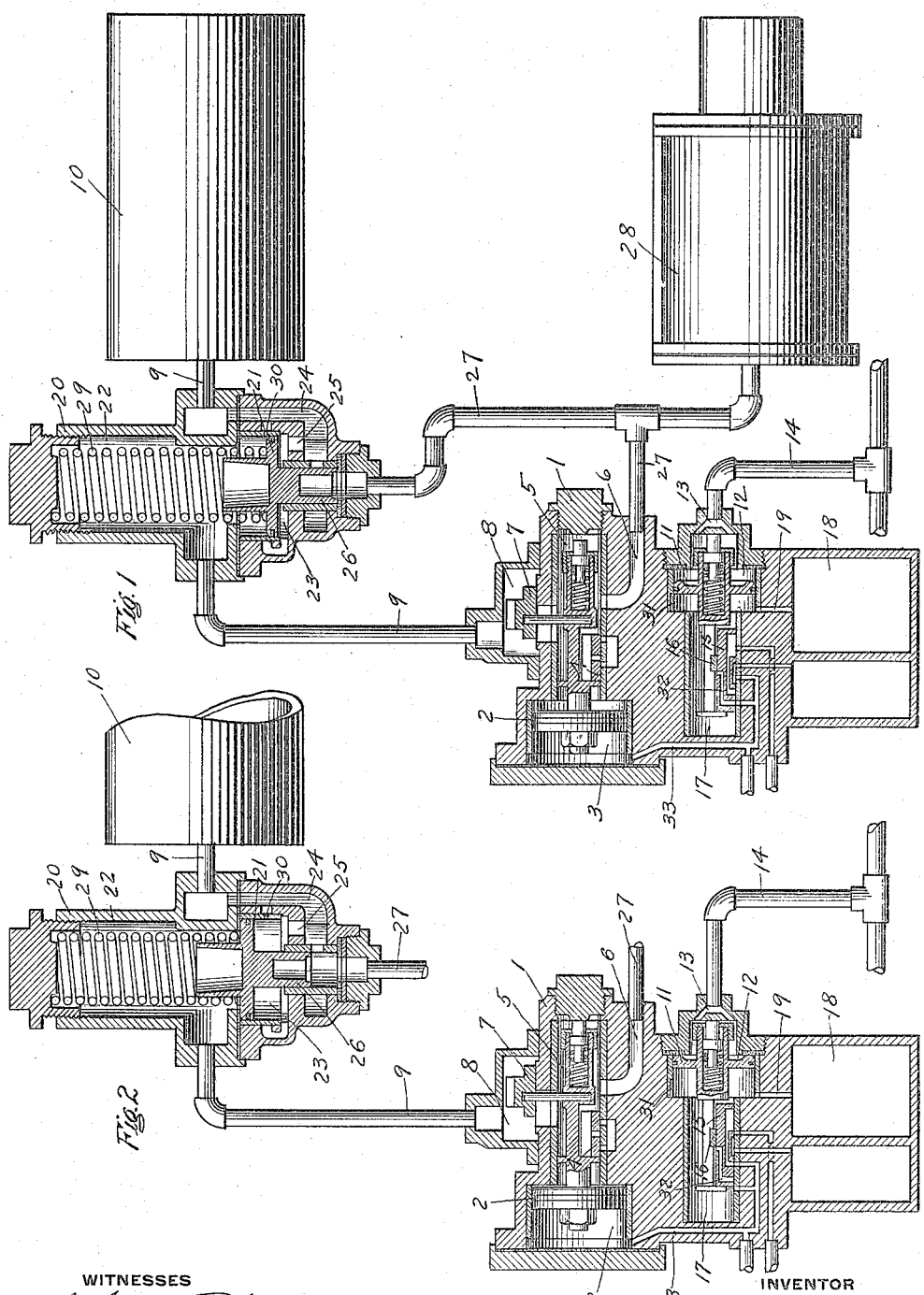

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,133,340.   Specification of Letters Patent.   Patented Mar. 30, 1915.

Application filed November 6, 1913. Serial No. 799,442.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to means for securing a higher pressure in an emergency application than in a service application of the brakes.

One object of my invention is to provide means operated by the flow of fluid to the brake cylinder in emergency for supplying additional fluid to the brake cylinder in order to secure a high pressure therein.

Another object of my invention is to provide means for limiting the degree of pressure of fluid supplied to the brake cylinder in emergency to a degree less than that of the source of fluid pressure supply.

In the accompanying drawing; Figure 1 is a central sectional view of a distributing valve device with a high pressure valve associated therewith and embodying my improvement, the distributing valve being shown in service application position, and Fig. 2 a similar view, showing the parts in emergency application position.

According to the drawing, my invention is shown applied in connection with a distributing valve device of the well known E T locomotive brake equipment, comprising a casing 1 having an application portion and an equalizing portion. The application portion comprises a piston 2 contained in application cylinder 3, a release valve 4 contained in valve chamber 5 open to brake cylinder passage 6, and application valve 7 contained in valve chamber 8 communicating through a pipe 9 with the main reservoir 10, said valves being operated by piston 2. The equalizing portion comprises a piston 11 contained in piston chamber 12 communicating through passage 13 with brake pipe 14, and main valve 15 and graduating valve 16 adapted to be operated by piston 11 and contained in valve chamber 17. The valve chamber 17 is connected to a pressure chamber 18 by passage 19 and the valves 15 and 16 control the admission and release of fluid under pressure to and from the application cylinder 3.

According to my invention, a valve device is interposed in the pipe 9 between the main reservoir 10 and the distributing valve device and comprises a casing 20 containing a piston 21 having a chamber 22 on one side open to pipe 9 on the distributing valve side and a chamber 23 on the opposite side open to the pipe 9 on the main reservoir side through passages 24 and 25. The piston 21 operates a valve 26 which controls communication from main reservoir passage 24 to a pipe 27 leading directly to brake cylinder 28.

The piston 21 is subject to the pressure of an adjustable spring 29 in chamber 22 which tends to maintain the piston 21 in the position seating the valve 26 and when the piston is in this position, a restricted port 30 establishes communication from the main reservoir to chamber 22 and the distributing valve device, said port being of such size as to permit only a service rate of flow.

In operation, fluid supplied to the brake pipe shifts the equalizing piston 11 to release position and the pressure chamber 18 is charged through the usual feed groove 31 around the equalizing piston. In release position of the equalizing valve device, the application cylinder 3 is connected to the atmosphere and the application piston 2 is in its outer position in which the brake cylinder is open to the exhaust. If a service application of the brakes is desired, a gradual reduction in brake pipe pressure is made and the equalizing piston 2 is thereupon shifted to service position, as shown in Fig. 1 of the drawing. Fluid is then supplied to the application cylinder 3 from the pressure chamber 18 through port 32 and passage 33. The pressure supplied to application cylinder 3 shifts the piston 2 to close the brake cylinder exhaust and open the valve 7 to a degree corresponding with the rate of reduction in brake pipe pressure. Fluid now flows from the main reservoir 10 through passage 24, port 30, chamber 22, and pipe 9 to valve chamber 8, and thence past valve 7 to valve chamber 5 and into the brake cylinder 28 through passage 6 and pipe 27. The restricted port 30 is large enough to provide for the service rate of flow, so that in making a service application of the brakes, no movement of piston 21 takes place. If a sudden reduction in brake pipe pressure is made, the equalizing piston is shifted to emergency position and the rate of flow to the application cylinder 3 is sufficient to shift the application piston to its extreme inner position, in which the application valve 7 is fully opened, as shown in Fig. 2 of the drawing. In this case, the restricted port 30 is not large enough to provide the necessary rate of flow from the main reservoir to the brake cylinder and consequently the higher main reservoir pressure acting in chamber 23 on piston 21 operates to shift the piston and open the valve 26. Fluid under pressure is then supplied from the main reservoir through a large opening directly to the brake cylinder. When the brake cylinder pressure has increased to a predetermined degree, dependent upon the tension of the spring 29, the piston 21 is forced downwardly by the spring closing the valve 26 and preventing further admission of fluid from the main reservoir to the brake cylinder. For example, if the main reservoir pressure is 110 pounds and the spring is set at 20 pounds, when the brake cylinder pressure has been built up to slightly exceed 90 pounds the piston will operate to close the supply valve.

It will be understood that my improvement may be employed in connection with various other forms of brake apparatus where it is desired to secure a higher pressure in emergency than in service.

Having now described my invention, what I claim as new and desire to secure by Letters Patent, is:—

1. In a fluid pressure brake, the combination with a source of fluid under pressure, a brake cylinder, and a valve device for controlling the flow of fluid from said source to the brake cylinder, of means operated upon a predetermined rate of flow from said source of pressure to the brake cylinder for also supplying fluid from said source to said brake cylinder.

2. In a fluid pressure brake, the combination with a source of fluid under pressure, a brake cylinder, and a valve device for controlling the flow of fluid from said source to the brake cylinder, of means operated upon the rate of flow from said source to the brake cylinder exceeding a predetermined degree for opening a direct connection from said source to the brake cylinder.

3. In a fluid pressure brake, the combination with a source of fluid under pressure, a brake cylinder, and a valve device operated in service for supplying fluid from said source to the brake cylinder and in an emergency application at a greater rate, of means operated by said greater rate of flow for opening a direct communication from said source to the brake cylinder.

4. In a fluid pressure brake, the combination with a source of fluid under pressure, a brake cylinder, and a valve device operated in service for supplying fluid from said source to the brake cylinder and in an emergency application at a greater rate, of a valve mechanism subject to the flow of fluid from said source to said valve device and having means for permitting a service rate of flow and operated upon an emergency rate of flow for opening a direct communication from said source to the brake cylinder.

5. In a fluid pressure brake, the combination with a main reservoir, a brake cylinder, and a valve device for controlling the supply of fluid from the main reservoir to the brake cylinder in service and emergency applications of the brakes, of a piston subject on one side to main reservoir pressure and on the opposite side to the pressure of fluid flowing from the main reservoir to said valve device and a valve operated by said piston in an emergency application for opening a direct connection from the main reservoir to the brake cylinder.

6. In a fluid pressure brake, the combination with a main reservoir, a brake cylinder, and a valve device for controlling the supply fluid from the main reservoir to the brake cylinder in service and emergency applications of the brakes, of a piston subject on one side to main reservoir pressure and on the opposite side to a spring and the pressure of fluid supplied to said valve device from the main reservoir, and a valve operated by said piston upon an emergency rate of flow to said valve device for opening a direct communication from the main reservoir to the brake cylinder.

In testimony whereof I have hereunto set my hand.

WALTER V. TURNER.

Witnesses:
A. M. CLEMENTS,
HOWARD J. BRUSH.

Copies of this patent may be obtained for five cents each, by addressing the "Commissioner of Patents, Washington, D. C."